US010115187B2

(12) United States Patent
Young et al.

(10) Patent No.: US 10,115,187 B2
(45) Date of Patent: Oct. 30, 2018

(54) APPARATUS AND PROCESSES FOR CLASSIFYING AND COUNTING CORN KERNELS

(71) Applicant: RAYTHEON COMPANY, Waltham, MA (US)

(72) Inventors: Darrell L. Young, Falls Church, VA (US); Charlotte DeKeyrel, Leesburg, VA (US)

(73) Assignee: RAYTHEON COMPANY, Waltham, MA (US)

( * ) Notice: Subject to any disclaimer, the term of this patent is extended or adjusted under 35 U.S.C. 154(b) by 174 days.

(21) Appl. No.: 15/011,004

(22) Filed: Jan. 29, 2016

(65) Prior Publication Data

US 2016/0225135 A1  Aug. 4, 2016

Related U.S. Application Data

(60) Provisional application No. 62/110,235, filed on Jan. 30, 2015.

(51) Int. Cl.
*G06T 7/136* (2017.01)
*G06T 7/00* (2017.01)
(Continued)

(52) U.S. Cl.
CPC .......... *G06T 7/0004* (2013.01); *G06K 9/6202* (2013.01); *G06K 9/6267* (2013.01);
(Continued)

(58) Field of Classification Search
CPC ......... G06T 7/0004; G06T 7/11; G06T 7/136; G06T 7/90; G06T 2207/30128; G06T 2207/30188; G06K 9/6202; G06K 9/6267
See application file for complete search history.

(56) References Cited

U.S. PATENT DOCUMENTS 6,886,136 B1 * 4/2005 Zlotnick .................. G06K 9/00
358/462
7,139,421 B1 * 11/2006 Fix .......................... G06K 9/00
382/141

(Continued)

FOREIGN PATENT DOCUMENTS

CN  103020970 A  4/2013
CN  103268492 A  8/2013
WO  2013101806 A1  7/2013

OTHER PUBLICATIONS

Amrutha, I. S., S. S. Shylaja, S. Natarajan, and K. N. Murthy. "A smart automatic thumbnail cropping based on attention driven regions of interest extraction." In Proceedings of the 2nd International Conference on Interaction Sciences: Information Technology, Culture and Human, pp. 957-962. ACM, 2009.*

(Continued)

*Primary Examiner* — Carol Wang
(74) *Attorney, Agent, or Firm* — Lando & Anastasi, LLP (57) ABSTRACT

Methods and apparatus are provided for identifying optimal threshold values to generate optimal binary images from a digital image. In one example, a method includes, for each of a plurality of candidate threshold values, processing an image using the candidate threshold value to create a first segmented image of a first plurality of blobs; for each of the plurality of candidate threshold values, calculating a threshold value evaluation metric as a count of qualifying blobs in the first plurality of blobs in the first segmented image, wherein the qualifying blobs have a fill factor exceeding a predefined fill factor and have an area within a predefined area range; identifying an optimal threshold value from the plurality of candidate threshold values for which the threshold value evaluation metric is maximized; and processing the image using the optimal threshold value to create a second segmented image of a second plurality of blobs.

18 Claims, 7 Drawing Sheets

(51) Int. Cl.
*G06K 9/62* (2006.01)
*G06T 7/11* (2017.01)
*G06T 7/90* (2017.01)

(52) U.S. Cl.
CPC .............. *G06T 7/11* (2017.01); *G06T 7/136* (2017.01); *G06T 7/90* (2017.01); *G06T 2207/30128* (2013.01); *G06T 2207/30188* (2013.01)

(56) References Cited

U.S. PATENT DOCUMENTS

| | | | | |
|---|---|---|---|---|
| 2005/0175243 | A1* | 8/2005 | Luo | G06K 9/00362 382/224 |
| 2006/0078926 | A1* | 4/2006 | Marcelpoil | C12Q 1/6886 435/6.14 |
| 2007/0058884 | A1* | 3/2007 | Rother | G06K 9/469 382/284 |
| 2008/0008376 | A1* | 1/2008 | Andel | G06K 9/00463 382/141 |
| 2010/0027911 | A1* | 2/2010 | Lefebvre | G06K 9/00986 382/294 |
| 2011/0158529 | A1* | 6/2011 | Malik | H04N 19/20 382/173 |
| 2012/0207360 | A1* | 8/2012 | Mehanian | G06K 9/0014 382/128 |
| 2015/0063651 | A1* | 3/2015 | Ishihara | G06K 9/48 382/110 |

OTHER PUBLICATIONS

Toh, Y. H., T. M. Ng, and B. K. Liew. "Automated fish counting using image processing." In Computational Intelligence and Software Engineering, 2009. CiSE 2009. International Conference on, pp. 1-5. IEEE, 2009.*

Annamalai, Palaniappan. "Citrus yield mapping system using machine vision." PhD diss., University of Florida, 2004.*

Yan, Chengxin, Nong Sang, and Tianxu Zhang. "Local entropy-based transition region extraction and thresholding." Pattern Recognition Letters 24, No. 16 (2003): 2935-2941.*

Bleau, A. et al. "A New Set of Fast Algorithms for Mathematical Morphology ii. Identification of Topographic Features on Grayscale Images", CVGIP Image Understanding, Academic Press, Dulth, MA, US, vol. 56, No. 2, Sep. 1, 1992, pp. 210-229.

International Search Report and Written Opinion for corresponding PCT/US2016/015725 dated Jun. 26, 2016.

Xia Xu et al. "The Analysis of Wheat Appearance Quality Based on Digital Image Processing", Environmental Science and INformation Application Technology (ESIAT), 2010 International Conference on IEEE, Piscataway, NJ, USA, Jul. 17, 2010, pp. 231-234.

* cited by examiner

| Ear | Datetime | Process Time | User | n | h | v | n_tot |
|---|---|---|---|---|---|---|---|
| 001 | 5/6/2015 12:37 | 5.5822 | jsmith | 168 | 25.0799 | 61.9481 | 707 |
| 002 | 5/6/2015 12:37 | 4.9965 | djones | 180 | 26.0235 | 59.6903 | 705 |

APPARATUS AND PROCESSES FOR CLASSIFYING AND COUNTING CORN KERNELS

RELATED APPLICATIONS

This application claims priority under 35 U.S.C. § 119(e) to U.S. Provisional App. No. 62/110,235, entitled "APPARATUS AND PROCESSES FOR CLASSIFYING AND COUNTING CORN KERNELS," filed Jan. 30, 2015, which application is incorporated herein by reference in its entirety.

BACKGROUND

There are numerous applications where it would be advantageous to accurately count the yield, or number of kernels on an ear of corn. The number and characteristic of the kernels on an ear of corn dictate the value of the corn. For example, an ear having more kernels, and in particular more large, round kernels, may command a higher price. Accurately counting and characterizing the kernels on an ear of corn therefore results in better valuation of the ear of corn, which may be used as representative in valuing an entire field or crop (or portion thereof) of corn. Ascertaining an accurate count and characterization of kernels is important not only to the buyers and sellers of the corn, but also to non-parties peripheral to the transaction, such as an insurance company insuring the corn prior to sale.

Currently, kernel counts may be determined by hand counting, in some cases coupled with further manual estimating performed based on those hand counts. The National Corn Growers Association promulgates one such manual counting method. These traditional methods suffer from a number of drawbacks, including inaccuracy due to miscounting or even bad handwriting. Such mistakes in counting or estimating are typically unintentional, and likely unavoidable given the vulnerability to human error, but the inability to easily verify a hand count or estimate based thereon may also conceal fraud or other willful misreporting when it occurs. There is an incentive for a buyer, for example, to undervalue a crop of corn, and for a seller to overvalue the crop. Improper estimates of yield may also lead to defrauding of insurance companies, or, on the other hand, of farmers being inadequately compensated by insurance in the event of damage to the crop. In short, the high risk of human error, inaccuracy, and a lack of verifiability associated with traditional methods dampens any confidence in kernel counts or estimates they generate.

SUMMARY OF THE INVENTION

Aspects and embodiments are directed to apparatus and methods for processing a digital image (e.g., of an ear of corn) by identifying optimal threshold values with which to generate optimal binary images from the digital image, and also to use those optimal binary images to estimate a count of the number of kernels on the ear of corn.

According to one embodiment, a method for processing a digital image includes, for each of a plurality of candidate threshold values, processing an image using the candidate threshold value to create a first segmented image of a first plurality of blobs; for each of the plurality of candidate threshold values, calculating a threshold value evaluation metric as a count of qualifying blobs in the first plurality of blobs in the first segmented image, wherein the qualifying blobs have a fill factor exceeding a predefined fill factor and have an area within a predefined area range; identifying an optimal threshold value from the plurality of candidate threshold values for which the threshold value evaluation metric is maximized; and processing the image using the optimal threshold value to create a second segmented image of a second plurality of blobs.

The method may further include determining a visible blob count of a number of visible blobs in the second segmented image of the second plurality of blobs, determining an average of vertical separation between the visible blobs in the second segmented image of the second plurality of blobs, determining an average of horizontal separation between the visible blobs in the second segmented image of the second plurality of blobs, and estimating a total count based on the visible blob count, the average of the vertical separation between the visible blobs, and the average of the horizontal separation between the visible blobs.

In one example, estimating the total count based on the visible blob count, the average of the vertical separation between blobs, and the average of the horizontal separation between blobs includes providing the blob count, the average of the vertical separation between blobs, and the average of the horizontal separation between blobs as inputs to a plurality of regression decision trees, wherein the total count is a target variable of the plurality of regression decision trees.

In another example, the method further includes dividing the image into a plurality of region images, wherein the plurality of region images corresponds to adjacent regions of the image. In yet another example, the method further includes transmitting the plurality of region images to a plurality of processors, wherein each of the plurality of processors performs the act of, for each of a plurality of candidate threshold values, processing a region image using the candidate threshold value to create the first segmented image of the first plurality of blobs.

In one example, the method further includes validating that the total count exceeds a first predefined threshold, and, for each of a plurality of horizontal rows of blobs, validating that a count of the number of blobs in each of the plurality of horizontal rows of blobs exceed a second predefined threshold. In another example, the method includes validating the image based on a characteristic selected from the group consisting of resolution, size, sharpness, and contrast. In one example, the predefined fill factor is 70%.

In one example, the method further includes performing adaptive histogram equalization on the image. In another example, the method further includes formatting the image to a Lab color space; determining, for each pixel in a plurality of pixels in the formatted image, a texture value of a region encompassing the pixel; responsive to the texture value of the region encompassing the pixel being greater than a predefined value, writing a first value for the pixel to a second image; responsive to the texture value of the region encompassing the pixel being less than the predefined value, writing a second value for the pixel to the second image; and cropping the image to a first region corresponding to a second region in the second image, wherein the plurality of pixels contained within the second region have the first value.

In another example, determining, for each pixel in the plurality of pixels in the formatted image, the texture value of the region encompassing the pixel includes determining an entropy value of the region encompassing the pixel. In another example, the method further includes categorizing, for each blob in the second plurality of blobs, an area of the blob, and categorizing, for each blob in the second plurality of blobs, an eccentricity of the blob.

In another example, the method further includes calculating at least one aggregate area metric of the second plurality of blobs, wherein categorizing, for each blob in the second plurality of blobs, the area of the blob is performed relative to the at least one area metric. In one example, the at least one aggregate area metric comprises a median area of the second plurality of blobs. In another example, categorizing, for each blob in the second plurality of blobs, the eccentricity of the blob is performed relative to a predefined eccentricity value.

According to another embodiment, an image processing system includes a memory; an image receiving component; and a processor configured to, for each of a plurality of candidate threshold values, process an image using the candidate threshold value to create a first segmented image of a first plurality of blobs; for each of the plurality of candidate threshold values, calculate a threshold value evaluation metric as a count of qualifying blobs in the first plurality of blobs in the first segmented image, wherein the qualifying blobs have a fill factor exceeding a predefined fill factor and have an area within a predefined area range; identify an optimal threshold value from the plurality of candidate threshold values for which the threshold value evaluation metric is maximized; and process the image using the optimal threshold value to create a second segmented image of a second plurality of blobs. In one example, the processor is further configured to determine a visible blob count of a number of visible blobs in the second segmented image of the second plurality of blobs, determine an average of vertical separation between the visible blobs in the second segmented image of the second plurality of blobs, determine an average of horizontal separation between the visible blobs in the second segmented image of the second plurality of blobs, and estimate a total count based on the visible blob count, the average of the vertical separation between the visible blobs, and the average of the horizontal separation between the visible blobs.

In another example, estimating the total count based on the visible blob count, the average of the vertical separation between blobs, and the average of the horizontal separation between blobs includes providing the blob count, the average of the vertical separation between blobs, and the average of the horizontal separation between blobs as input to a plurality of regression decision trees, wherein the total count is a target variable of the plurality of regression decision trees. In one example, the processor is further configured to divide the image into a plurality of region images, wherein the plurality of region images corresponds to adjacent regions of the image. In another example, the processor is further configured to validate that the total count exceeds a first predefined threshold; and, for each of a plurality of horizontal rows of blobs, validate that a count of the number of blobs in each of the plurality of horizontal rows of blobs exceed a second predefined threshold.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

The ability to capture and process images of visible items (e.g., corn kernels) on smart phones or other devices, and use those images to estimate a total number of (visible and invisible) items based on previously observed data enables a user to generate an objective and accurate estimate. Aspects and embodiments are directed to allowing a user to capture an image of an ear of corn on a smart phone, digital camera, or other device. A binary image may be generated from the image in order to isolate regions having colors typically associated with an ear of corn, such as yellow to yellowish-white. The largest of these isolated regions may be examined to see if it is of the size, orientation, and shape generally associated with an ear of corn.

If an ear of corn is detected in the binary image, the captured image may be cropped to include only the ear of corn, thereby eliminating the need to process unnecessary portions of the image. The captured image may also be downsampled, oriented, and resized to a standard size and orientation to optimize processing time and accuracy.

To allow for parallel processing, the captured image is split into a number of region images corresponding to adjacent regions of the captured image. Further processing of the region images may be performed by one processor, or by multiple processors working in parallel to speed performance. Each of the region images is independently adaptively equalized. The region images are then each iteratively converted into a binary image according to an iterating candidate threshold value. Generating a binary image in this manner may cause the area of the binary image to be segmented into a plurality of substantially enclosed blobs on a background for some or all of the candidate threshold values. For each binary image generated in this manner, a candidate threshold evaluation metric is calculated as a measure of how accurately the binary image represents the kernels on the ear of corn in the captured image. An optimal threshold value corresponding to the optimal (e.g., maximal) threshold evaluation metric for each region image is identified, and the corresponding binary image is used to represent that region of the ear of corn in a combined binary image. In this way, each region of the ear of corn has been independently optimized for detection of kernels in later processes.

The combined binary image is then used to detect certain aggregate characteristics of the kernels represented in the combined binary image, and regression techniques are performed on those aggregate characteristics to estimate a total number of kernels on the ear of corn in the captured image.

Embodiments of the systems and methods disclosed herein may be useful in a wide variety of situations where image processing is used to detect and characterize expected features in a digital image. To give just one example, the methods disclosed herein may be used to independently optimize regions of a digital image of a public space in order to detect human faces in the space. The optimized digital image may then be used to estimate the number of humans in a larger area that cannot be entirely captured in the image, such as a stadium or public transit station. The spacing, location, and other characteristics of the objects in the image may aid in such an estimate, which may be generated by regression or other techniques.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
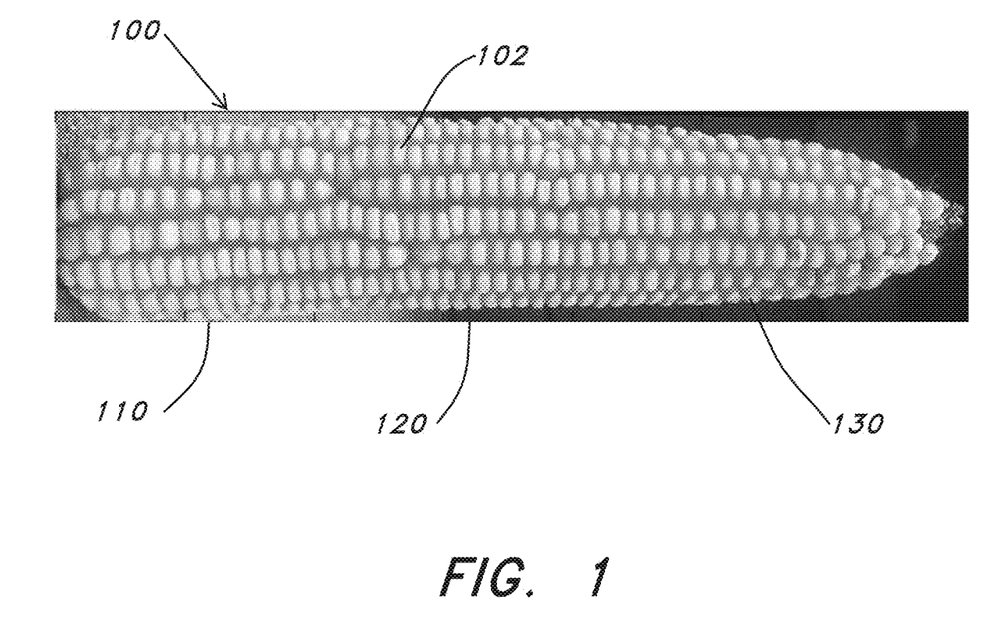
FIG. 1 illustrates an exemplary ear of corn as discussed in various embodiments herein.

FIG. 1 illustrates an exemplary ear 100 of corn, on which kernels (including kernel 102) are arranged generally in rows along a length of the ear 100. The ear 100 may be conceptualized as having three adjacent, contiguous vertical regions 110, 120, 130 along the length of the ear 100 and wrapping around the circumference of the ear 100. Each of the regions 110, 120, 130 has different shape characteristics that may be taken into account when performing the claimed methods and systems disclosed herein. By treating the ear 100 as having multiple regions, each region can be optimized for kernel detection independently according to its particular shape and size characteristics.

In the example illustrated in FIG. 1, the shank region 110 is a generally cylindrical region forming the widest part of the ear 100 (i.e., the region having the greatest diameter). The distribution of large, flat kernels may be relatively high on the shank region 110. The middle region 120 is also generally cylindrical, though with a smaller diameter than the shank region 110. The middle region 120 tapers further in diameter to the tip region 130, which is generally cone-shaped, and may contain mostly smaller, rounder kernels on average. The regions 110, 120, 130 and the boundaries delineating them are conceptual and are therefore somewhat subjective. The number of conceptual regions on the ear 100 therefore need not be limited to three. For example, the ear 100 may be considered to have six or twelve vertical regions, or more.

According to some embodiments, an image of the ear of corn may be captured and processed by thresholding the image to create a binary image (i.e., one in which each pixel is one of two colors, typically black and white). In particular, each pixel of the image is assigned a white value if the pixel's luminance value is higher than a given threshold luminance value, or a black value if the pixel's luminance value is lower than the given threshold luminance value. By selecting the optimal threshold, the image may be thresholded to create a binary image made up of a number of "blobs," or contiguous regions of similar colors or other values, with each blob corresponding to a kernel of corn. The more accurately the blobs reflect the shape and size of the photographed kernels, the more accurately counting and characterization of kernels by size and shape can be performed.

Figure 2:
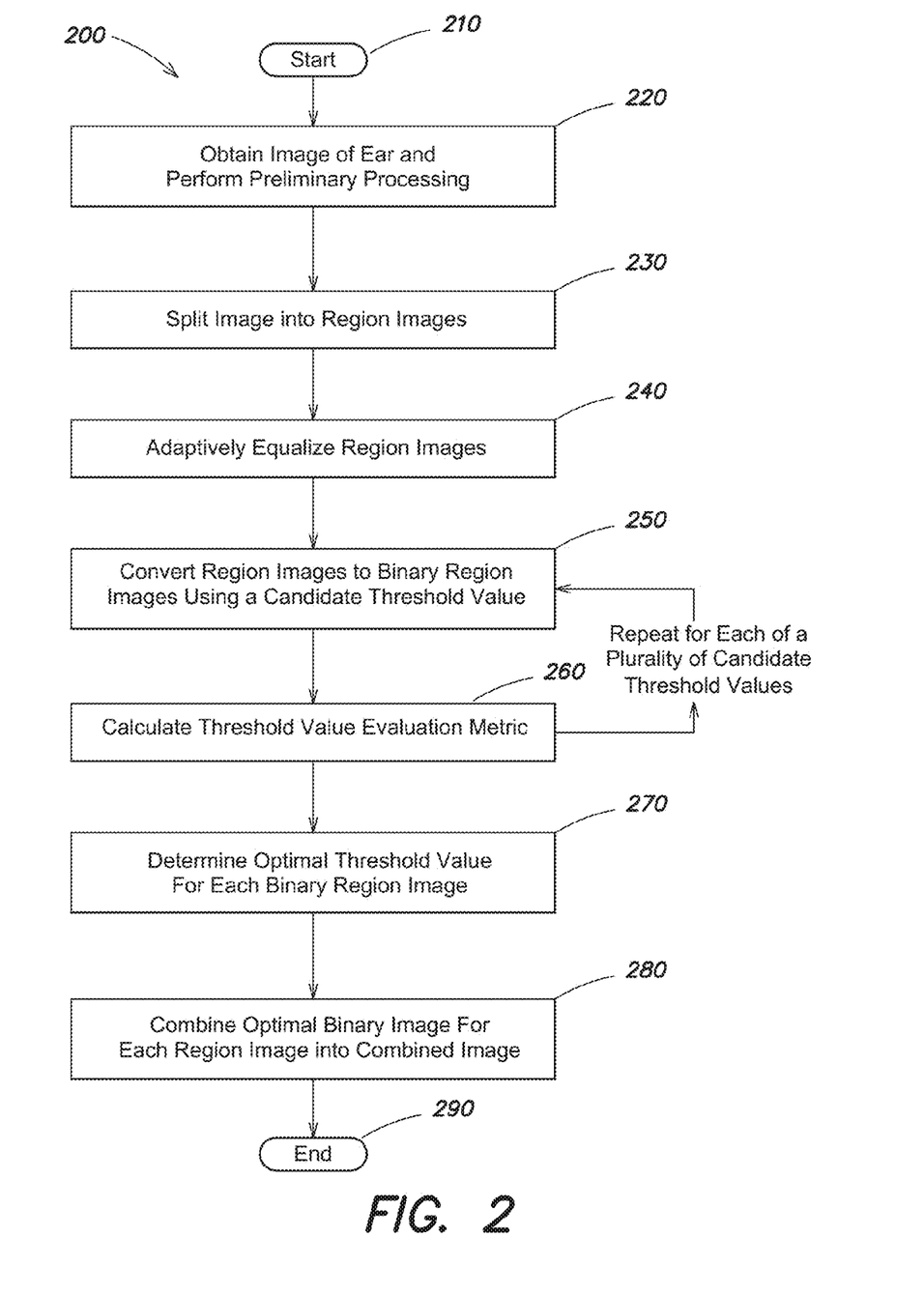
FIG. 2 is a flow diagram of one example of determining an optimal threshold for generating a binary image and processing a digital image using that threshold, according to aspects of the invention.

FIG. 2 is a flow diagram for one example of a method 200 for determining an optimal threshold and processing the digital image using that threshold.

Method 200 begins at step 210.

At step 220, an image of an ear of corn is obtained by a computer system, and preliminary processing is performed to generate a modified image to be used as input to subsequent steps. The image of the ear of corn may be captured by a digital camera, or by a mobile device (e.g., a cell phone or tablet) with a camera and image-capturing capabilities. In other embodiments, the image is not directly captured, but may be received over a network, on a disk, or otherwise provided to the system for processing.

The size of the image may also be validated or modified as necessary. For example, if the image is of too low a resolution, size, contrast, or sharpness, it may be assumed that the method cannot be performed on the image in a manner yielding sufficiently accurate results. As a result, an attempt to perform the method on an image having inadequate an resolution (e.g., less than 2 megapixels), size, contrast, or sharpness may be aborted by the system, and an error message may be displayed to the user indicating that the image is deficient, as well as information identifying the deficiency.

On the other hand, while digital cameras and devices are currently able to capture relatively high-resolution images, and typically do so by default, it may be determined in some embodiments that such high resolution is not necessary for performance of the method. Furthermore, the large file sizes associated with such high-resolution images typically require an unnecessary amount of time and resources to process. The image may therefore be downsampled to a lower resolution that reduces file size while still providing sufficient resolution for the image processing steps described herein. Downsampling the image to a standardized resolution may also simplify subsequent processing steps, as there would be no need to provide for the processing of images having different resolutions. In a preferred embodiment, the image may be downsampled to 2 megapixels. In other embodiments, the resulting resolution may be set by the system or a user, or may be determined at runtime by taking into account such factors as the file size, resolution, or dimensions of the original image, or the currently available processing bandwidth of the system.

The image may also be preliminarily processed to verify the existence and location of a probable ear of corn in the image. In a preferred embodiment, the image is processed to determine the texture of the image or a subset of pixels in the image. The texture of a region of an image may be understood as a function of the spatial variation in pixel intensities in that region. Regions having relatively high variations in pixel intensities may be visualized as "rough," whereas regions where pixel intensities are relatively homogeneous (i.e., have relatively low variations) may be considered "smooth." Texture analysis may allow an ear of corn to be detected in the image even where the characteristic of the corn or ambient conditions such as lighting make recognition of the ear by color or other characteristic unreliable or impossible.

According to some embodiments, the texture value of a particular pixel is determined by defining a region around the pixel and determining a texture statistic for that region, then assigning the texture statistic for that region as the texture value of the pixel. For example, the texture value of a pixel may be determined as the range (i.e., difference between high and low values) of pixel intensities for the region around the pixel. As another example, the texture value of a pixel may be determined as the standard deviation of pixel intensities for the region around the pixel. As yet another example, the texture value of a pixel may be determined as a function of the local entropy (i.e., randomness) of the region around the pixel. In one embodiment, a texture analysis function may be performed by the MATLAB package offered by The Mathworks, Inc., of Natick, Mass.

In other embodiments, the image is analyzed to locate a region matching the expected characteristics of a photograph of corn, such as a generally yellow to white color and an overall shape associated with ears of corn. In some embodiments, the image is converted to a multi-dimensional image format with dimensions (i.e., values) for lightness/tone and component colors. In a preferred embodiment, the image is converted to the Lab color space, with each pixel in the image a lightness dimension L and color dimensions a and b. One or more of the color dimensions of each pixel may be examined to determine if the pixel is within a target range of expected colors (e.g., yellow to whitish-yellow) associated with an ear of corn. An ear detection image may be generated. According to one embodiment, the ear detection image is a binary image, with pixels in the target range turned "on" (i.e., assigned a "high" value) and pixels not in the target range turned off. The resulting ear detection image may then be "smeared" by adjusting each pixel according to an averaged value of the surrounding pixels; doing so may reduce or eliminate any inconsistencies due to lighting or other conditions. If a blob in the ear detection image is detected that has an area within an expected range, appears in an expected region of the ear detection image, and/or appears in an expected orientation, the blob may then be assumed to be the ear of corn. If no blob meets those expectations, processing may be stopped, and an error message may indicate that no ear of corn was detected in the ear processing image.

To further streamline processing, the original downsampled image can then be cropped to the region corresponding to the area where the ear of corn was detected in the ear detection image, resulting in an image substantially filled by the ear of corn. The image may also be straightened through rotation or other orientation change so that a centerline along the longitudinal axis of the ear is parallel to the upper and lower edges of the image. The image may also be resized to standardized dimensions to reduce the complexity of later processing steps. In one embodiment, the image is resized to 1400 pixels wide by 400 pixels high; however, numerous other image sizes can be used.

Figure 3A:
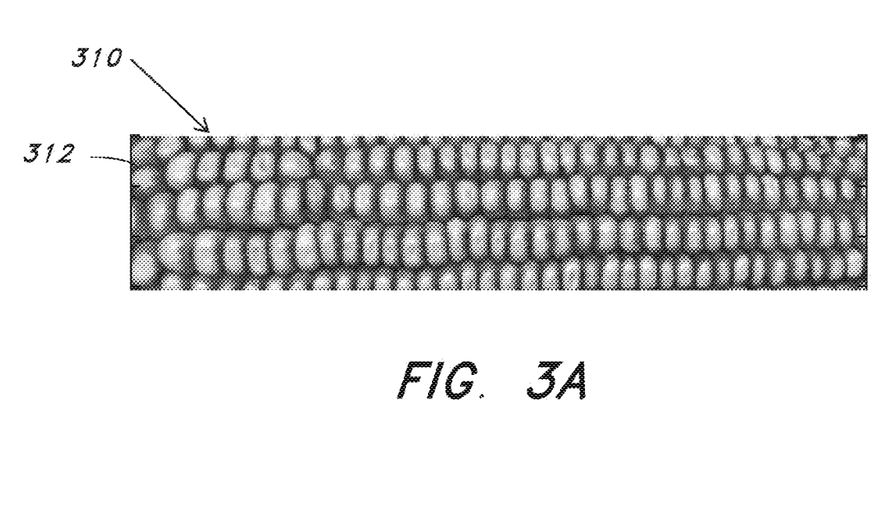
FIG. 3A illustrates an exemplary cropped captured image of an ear of corn according to aspects of the invention.

FIG. 3A shows an exemplary cropped image 310 of an ear 312 of corn.

Returning to FIG. 2, at step 230, the image may be split into a number of vertical region images representing adjacent regions of the ear of corn, with the vertical region images being processed in parallel in later steps. As discussed above, splitting the image in this way allows each region to be independently optimized for kernel detection according to its particular shape and size characteristics, and taking into account differences in lighting and other environmental aspects. In an exemplary embodiment, the image may be captured by a smart phone or other mobile device with limited processing ability. The image may be split by the mobile device into a number of vertical region images, with those images being transmitted to one or more remote servers for further processing as discussed herein.

Figure 4:
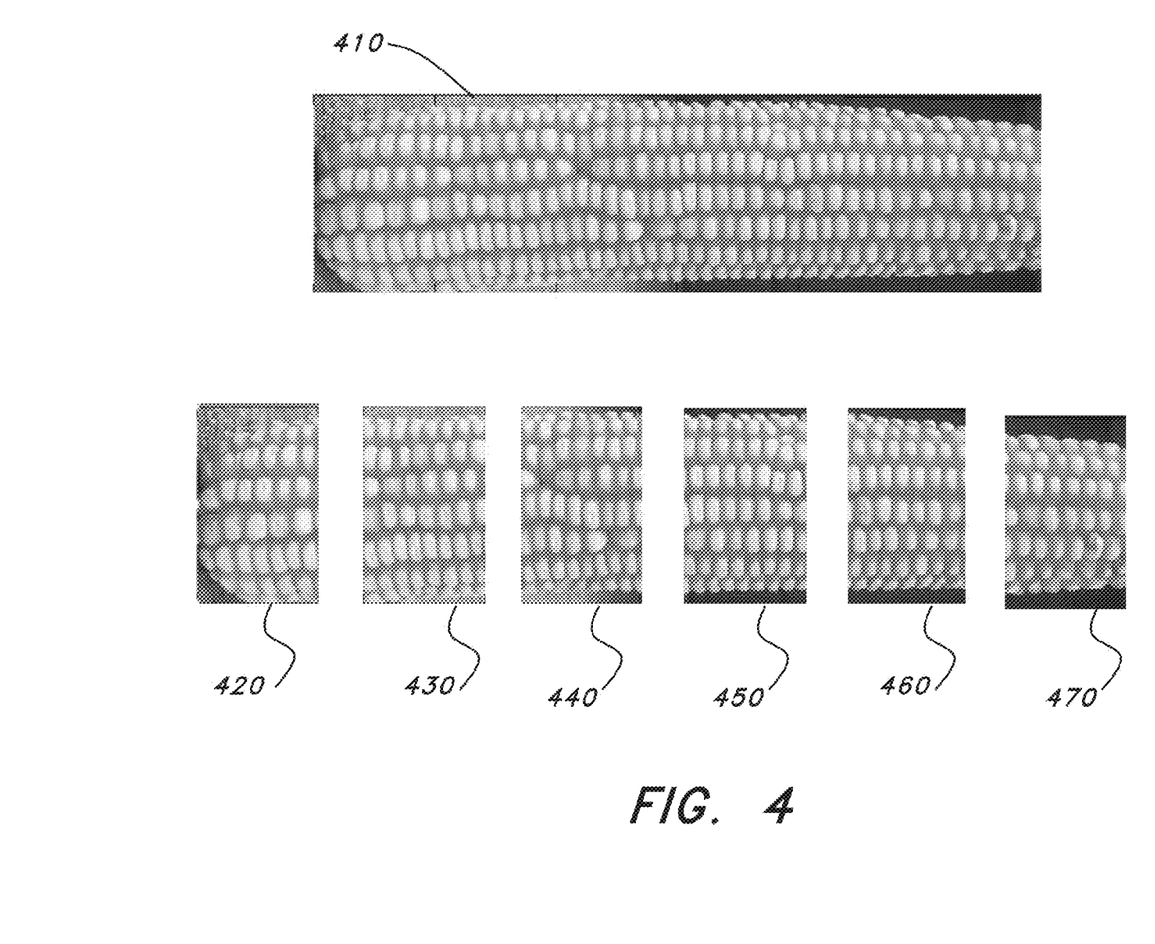
FIG. 4 illustrates a number of region images according to aspects of the invention.

In a preferred embodiment, the image is split into six vertical region images. FIG. 4 shows six exemplary vertical region images 420-470 generated from image 410. In other embodiments, the image may be split into any number or configuration of images, subject to considerations relating to parallel processing and the number and size of the resulting region image files. In some embodiments, the image may be split into horizontal region images, with the top, middle, and bottom of the ear of corn appearing in different region images. This arrangement may be desirable where lighting conditions are different on the top, middle, and bottom. such as the bottom of the ear being in shadow.

At step 240, each of the vertical region images is adaptively equalized to improve the contrast in each of the images. In some embodiments, adaptive histogram equalization (AHE) or contrast-limited adaptive histogram equalization (CLAHE) is performed on each of the vertical region images. The contrast values may be adjusted and constrained according to a predefined contrast enhancement limit. Similarly, the amount of storage used in generating the histogram used to adaptively equalize the image may be specified. A higher amount of storage generally results in a greater dynamic range (and therefore the possibility for greater accuracy in subsequent steps) at the cost of slower processing speed. Therefore, the amount of storage used in generating the histogram may be predetermined, may be defined or adjusted by the user, or may be determined at runtime, taking into account such factors as the file size, resolution, or dimensions of the vertical region images, or the currently available processing bandwidth of the system. In some embodiments, a desired distribution of the histogram may be indicated. For example, the system may be instructed to generate a uniform (i.e., flat) histogram, a Rayleigh (i.e., bell-shaped) histogram, or an exponential (i.e., curved) histogram. Other desired distributions may also be indicated.

At step 250, each of the vertical region images is converted to a binary image using one candidate threshold value of a range of candidate threshold values. In particular, if a pixel's luminance value meets or exceeds the candidate threshold value, the pixel will appear "on" (e.g., white) in the binary image; if the pixel's luminance value is less than the candidate threshold value, the pixel will appear "off" (e.g., black) in the binary image. In the binary image, each kernel of corn may appear as a blob. In one embodiment, for some candidate threshold values, each kernel of corn may appear as a contiguous white region (i.e., a blob) on a black background. In some embodiments, each of the binary images is generated by computing an extended-minima transform or H-minima transform of the vertical region images.

Because the ear of corn in the captured image is generally round, the appearance of kernels becomes compressed the closer they are to the top and bottom horizons of the ear. For example, a kernel near the top horizon may appear smaller and flatter in the captured image than an identically sized kernel near the center of the ear on the captured image. In some embodiments, this distortion is corrected for or adjusted. For example, knowing the angle of the ear in the captured image (roughly it radians), the amount of distortion can be determined, and areas of the binary image can be stretched to correct for the compression due to the position of the camera.

At step 260, a threshold value evaluation metric is calculated, which measures how well the blobs in the binary image generated using the candidate threshold value represent the kernels on the ear of corn captured in the image. In some embodiments, the threshold value evaluation metric may be calculated with reference to the fill factor and area of the blobs in the binary image. A blob's fill factor may be defined as the percentage of "on" (e.g., white) pixels enclosed within a perimeter of the blob. A blob in which all pixels are white may have a fill factor of 100%. In some lighting or other ambient conditions, some of the pixels within the blob may be "off" (e.g., black) because they do not meet or exceed the threshold value for generating the binary image. A higher fill factor for a particular blob may represent a higher likelihood that the blob accurately represents the shape and size of the corresponding kernel in the image. Similarly, the fact that a particular blob has an area within a range typically expected for a corn kernel may also suggest that the blob accurately represents the shape and size of the corresponding kernel in the image.

In one embodiment, therefore, the threshold value evaluation metric may be calculated as a function of the count of the number of blobs in the binary image that have a fill factor exceeding a certain fill factor threshold, and an area within an expected area range. In a preferred embodiment, the fill factor threshold in 70%. The expected area range may be predefined. In a preferred embodiment where the image is resized to 1400 pixels wide by 400 pixels high, the expected area range may be from 225 to 5625 units of pixels. In other embodiments, the expected area range may be determined from a statistical evaluation of the binary image. For example, the expected area range may be defined as those area values falling between the 25th and 75th percentile of the areas of all blobs detected within the binary image.

In other embodiments, other characteristics of the binary image may be referred to in calculating the threshold value evaluation metric. In some embodiments, the number of blobs in the binary image, their average area, and the standard deviation of their density within the binary image may be used in calculating the threshold value evaluation metric. In one embodiment, the threshold value evaluation metric is calculated as:

$$\frac{N(k)^{1.2}}{\mu(k)_A \sigma(k)_p}$$

where $N(k)$ is the number of detected blobs in the binary image, $\mu(k)_A$ is the average area of the detected blobs in the binary image, and $\sigma(k)_p$ is the standard deviation of the density of the detected blobs in the binary image. According to this threshold value evaluation metric, a higher number of detected blobs in the binary image, a lower average area of those blobs, and a lower standard deviation of the density of the detected blobs each may suggest that the blobs in the binary image represent relatively accurately the size and shape of the kernels on the ear of corn in the detected image.

Steps 250 and 260 are performed iteratively for each value in the range of candidate threshold values. In some embodiments, the range of candidate threshold values may be every possible luminance value, i.e., from 0 to 255, meaning that every possible candidate threshold value is used to generate a binary image for each vertical region image and calculate a candidate threshold value evaluation metric. In other embodiments, the range of candidate threshold values may be limited to a range expected to yield the most optimal candidate threshold value for an image of an ear of corn. In still other embodiments, not every value in the range of candidate threshold values may be used; rather, every ith candidate threshold value may be used until the resulting candidate threshold value evaluation metric falls within a certain range, suggesting that the candidate threshold value evaluation metric is approaching an optimal candidate threshold value evaluation metric. Every subsequent candidate threshold value may then be used to generate a binary image. Known methods of converging on an optimal value for a particular problem may be used without departing from the spirit of the invention.

At step 270, the optimal threshold value for each vertical region image is determined with reference to the threshold value evaluation metric for each of the candidate threshold values. In one embodiment, the optimal threshold value for a vertical region image is the one yielding the highest candidate threshold value evaluation metric for the vertical region image.

Parallel processing of the multiple vertical region images may result in better performance through quicker processing, because load balancing and other parallel processing techniques may be employed. In some embodiments, therefore, the vertical region images may be sent to one or more processors, and steps 250, 260, and/or 270 may be performed by those processors. In one embodiment where the captured image is split into six different vertical regions, each of the six vertical regions is sent to one of six processors to perform steps 250, 260, and/or 270. These processors may be remote systems, physical servers, server instances, apps, cloud-based computing systems, or other systems or components capable of processing images as discussed herein. In other embodiments, other steps (e.g., all of the steps) of the method 200 may be performed by multiple processors in the same manner. Results from each of the multiple processors may be processed in turn by the multiple processors, or may be returned to a primary location (e.g., a control system) for further processing.

At step 280, the binary images generated from each of the vertical region images using the optimal threshold value are combined to create a combined binary image of the entire ear of corn. Each of the vertical regions represented in the combined binary image has therefore been processed using the optimal threshold value for that region. In some embodiments, a binary image is re-generated for each vertical region image using the optimal threshold value once the optimal threshold value is known. In other embodiments, as steps 250 and 260 are iteratively performed, the "most optimal" binary image (i.e., the binary image generated using the candidate threshold value most optimal so far) is stored, and subsequently passed to step 280; less optimal binary images may be deleted or overwritten.

Figure 3B:
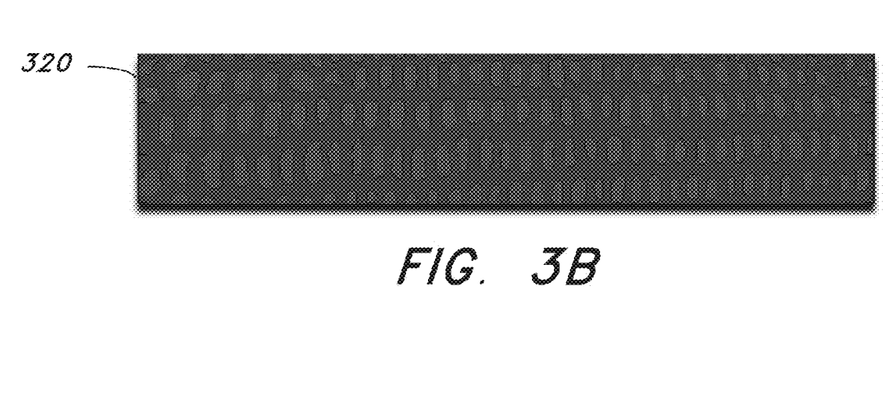
FIG. 3B illustrates an exemplary binary image generated from the cropped captured image of FIG. 3A using optimal threshold values according to aspects of the invention.

FIG. 3B shows the combined binary image 320 generated from the exemplary cropped image 310 of the ear 312 of corn shown in FIG. 3A.

Returning to FIG. 2, at step 290, process 200 ends.

The combined binary image, which contains blobs determined in method 200 to most accurately represent the visible kernels on the ear of corn in the captured image, can be used to estimate the total number of kernels on the ear of corn. Generally speaking, such estimation may be performed by determining a count of the number of blobs (i.e., kernels) visible in the combined binary image, which represents only a portion of the entire ear. The count can then be extrapolated using the relationship of the portion to the entire ear. This estimation may also be performed through the use of regression, using one or more trained decision trees or other classification models. In a preferred embodiment, certain values are passed to one or more decision trees, the values including the count of the blobs in the combined binary image, the average vertical separation between blobs in the combined binary image, and the average horizontal separation between blobs in the combined binary image; derived values calculated from relationships among or involving these values may also be used. The one or more decision trees output a value corresponding to an estimated total number of kernels on the ear of corn in the captured image.

Figure 5:
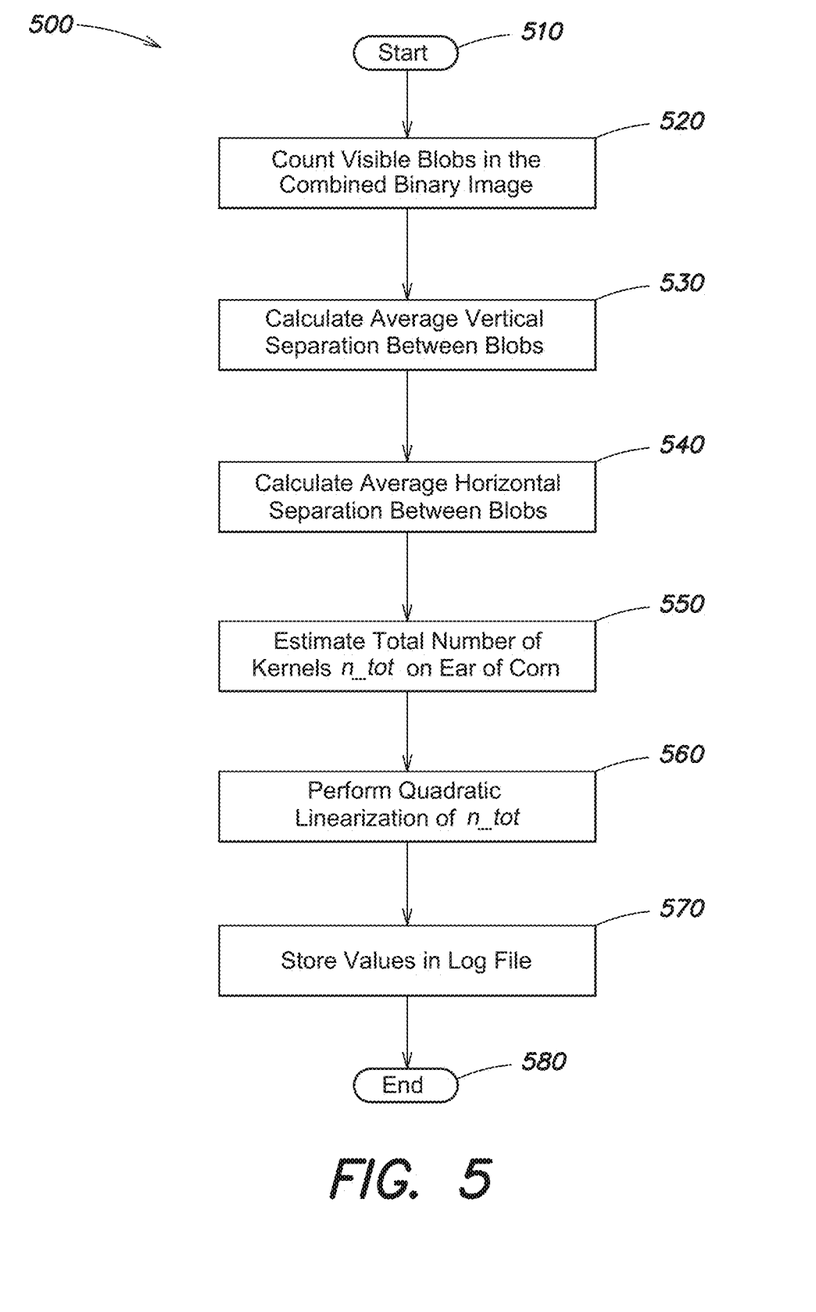
FIG. 5 is a flow diagram of one example of a process of estimating a total number of kernels on the ear of corn in the captured image according to aspects of the invention.

FIG. 5 is a flow diagram for one example of a method 400 for estimating a total number of kernels on the ear of corn in the captured image based on the blobs in the combined binary image.

Method 500 begins at step 510.

At step 520, a count of the visible blobs in the combined binary image is performed. In some embodiments, individual blobs may be included or excluded from the count based on the likelihood that the blob represents a kernel on the ear of corn in the captured image with some amount of accuracy. For example, a blob may be included in the count according to one or more criteria, such as its fill factor exceeding a certain threshold (e.g., 70%), its area being within a certain range, and its eccentricity falling below a certain threshold.

In some embodiments, the count of the visible blobs generated in step 520 may be validated to ensure that it falls within an acceptable range, as values outside the range may indicate that the count is inaccurate. In one example, the count of the visible blobs may be validated to ensure that at least 60 blobs are detected. In some embodiments, additional validation counts may be performed. In one example, a blob row count of the number of adjacent blobs in each row may be determined, and the blob row count may be validated to ensure that it falls within a certain range (e.g., at least 15 blobs in each row). If the validation steps fail, the system may abort processing of the image and return an error message.

At step 530, an average of the vertical separation between blobs in the combined binary image is calculated, and at step 540, an average of the horizontal separation between blobs in the combined binary image is calculated. In some embodiments, the separation between two adjacent blobs is determined as the distance between the centerpoints of the blobs. The centerpoint of a blob may be defined as the mean of the coordinates of the border, or as the point with the minimal sum of distances to all points of the area measured along paths inside the area.

Two horizontally adjacent blobs may be identified by identifying two adjacent blobs having minimally different vertical coordinates within the binary image. These two horizontally adjacent blobs may be considered to represent kernels of corn on the same row on the ear. Blobs horizontally adjacent to those blobs may in turn be found, and so on, until a row of blobs is identified. The row of blobs may be preferably located near the vertical center of the image, where (as discussed above) distortion due to the curvature of the ear is minimal. Two vertically adjacent rows of blobs may be identified in this manner, with the centerpoint of each blob being located. The average horizontal distance between the blobs in these rows may be used as the average of the horizontal separation between blobs in the combined binary image.

In some embodiments, the average distance between these vertically adjacent rows is used as the average of the vertical separation between blobs in the combined binary image. In a preferred embodiment, a line may be found through the centerpoints of the kernels of each of the two rows, and the line fitted to a third or fourth degree polynomial. The average distance between the lines may be used as the average of the vertical separation between blobs in the combined binary image.

At step 550, one or more estimates of the total number n_tot of kernels on the ear of corn is made. In some embodiments, regression analysis is performed on the values determined in steps 520, 530, and 540, and/or on values derived from those values. In one embodiment, regression analysis is performed using inputs based on the count n of visible blobs in the binary image (as determined in step 520), the average horizontal separation h (in pixels) between horizontally adjacent blobs in the binary image (as determined in step 530), the average vertical separation v (in pixels) between vertically adjacent blobs in the binary image (as determined in step 540), and the derived value 1/hv. In a preferred embodiment, these four values are passed to a decision tree process in the form a 4-element input vector:

$$\text{input vector} = [n, h, v, 1/(h*v)]$$

In some embodiments, the decision tree process is the TreeBagger function of the MATLAB package. The decision tree process may implement one or a plurality, or ensemble, of decision trees for predicting a predicted value n_tot as a function of the input vector.

In some embodiments, the decision tree process receives as input a set of training data with which to build an ensemble of decision trees. The training data may include analogous information corresponding to the input values and predicted value employed by the decision tree. In one example, the training data is a matrix of information about other, known ears of corn (i.e., ears of corn other than the one in the captured image). In some embodiments, the known ears of corn may be chosen due to the relevance of the strain of corn, source, or location (e.g., field, row, portion of row) associated with the known ear of corn.

The training data includes values of n, h, v, and 1/hv as observed on those ears of corn (either manually or in earlier runs of the present methods), as well as an observed total number obs_tot of kernels for those ears of corn. Those observed totals may have been determined through manual counting of the kernels, or through earlier runs of the present methods for which the accuracy exceeds a desired confidence value. The decision tree process uses the relationship between n, h, v, 1/hv, and obs_tot in the training data in order to predict n_tot for a given input vector of n, h, v, and 1/hv.

By performing an automated regression analysis in this manner, processing function is improved due to increased accuracy and reduced processing speed, thereby yielding a better result than traditional methods that rely on either manual counting or extrapolating a total count using the geometric characteristics of the ear of corn. Performing such a regression analysis manually in the (literal corn) field would be impractical, given the number of calculations required. Different regression methods may also be employed without departing from the spirit of the invention.

At optional step 560, the estimate of the total number n_tot of kernels on the ear of corn may be further refined by performing a quadratic linearization of the one or more estimates of the total number n_tot of kernels. In one embodiment, n_tot may be refined to n_tot' according to the equation:

$$n\_tot' = a \times n\_tot^2 + b \times n\_tot + c$$

The values for constants a, b, and c may be known from previous iterations of the method, or through a regression analysis comparing actual observations (i.e., manual kernel counts) with the value of n_tot determined at step 550. By using suitable coefficients, the polynomial equation may refine the estimate of n_tot by lessening the effect of minor differences between input values. It will be appreciated that not all embodiments perform step 560, and that subsequent references to n_tot should be understood to also refer to n_tot', and vice versa.

At optional step 570, the input values as well as n_tot for the ear of corn in the captured image may be stored in a log file and/or transmitted for storage or further use. Similar data about other ears of corn may also be stored in the log file. The binary image and/or the captured image may also be stored in association with the log file.

Figure 6:
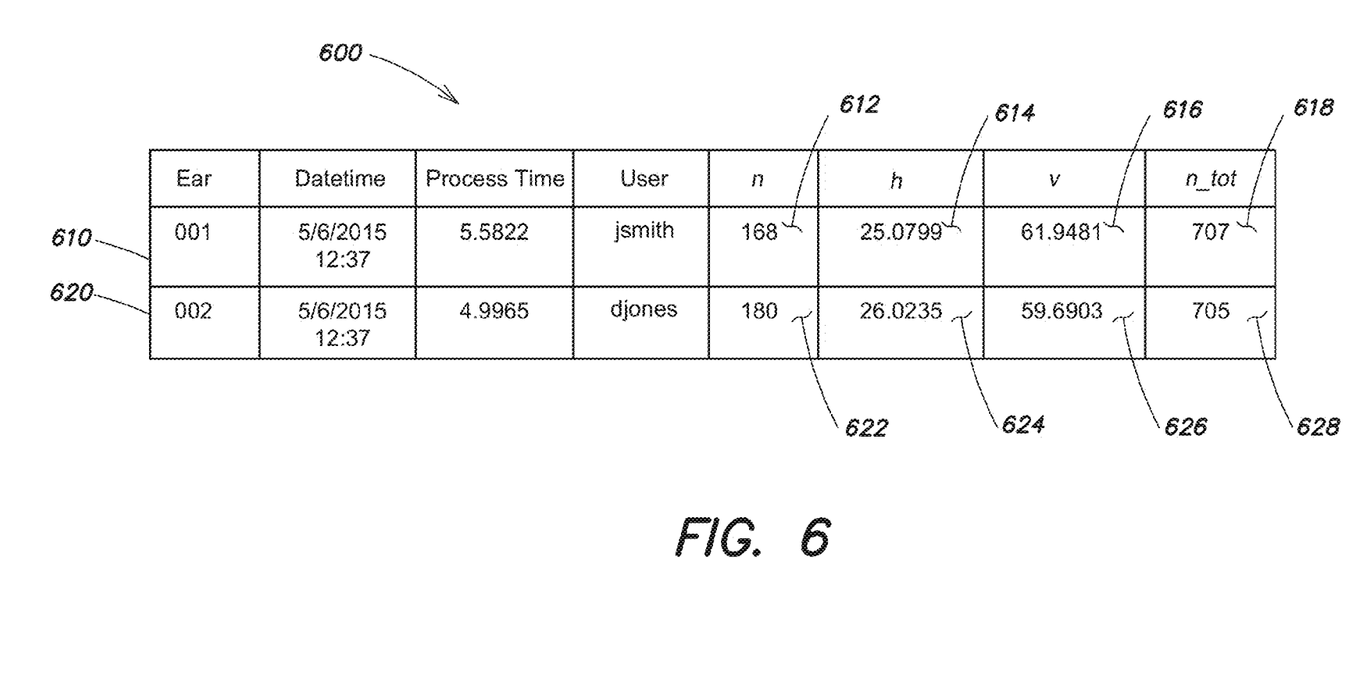
FIG. 6 illustrates entries from an exemplary log file according to aspects of the invention.

FIG. 6 depicts a sample log file 600 generated in step 570. The log file 600 contains entries 610, 620 about two ears of corn including the n values 612, 622, h values 614, 624, v values 616, 626, and n_tot values 618 and 628 for each of the ears. Metadata may also be stored in the log file 600, including such information as the datetime at which the image was captured or processed, the amount of time to process the image, as well as the identity of the user who captured the image and/or caused the method to be performed.

Returning to FIG. 5, at step 580, process 500 ends.

Additional information about the ear of corn and the kernels on it may also be determined from the combined binary image. For example, individual blobs may be examined to characterize the size or shape of the corresponding kernel. In some embodiments, the size of each individual blob may be compared against a given size value; blobs smaller than the given size value may be characterized as small, whereas blobs larger than the given size value may be characterized as large. In one embodiment, the given size value may be calculated as the mean or median size of all blobs within the binary image. In other embodiments, one or more percentile values for the size of all of the blobs within the binary image may be calculated. Individual blobs may then be characterized relative to the percentile values. For example, a blob having an area between two percentile values may be characterized as medium sized, whereas a blob having an area less than the lower of the percentile values may be characterized as small. Similarly, the shape of the blobs may be used to characterize the shape of the corresponding kernels. For example, if the eccentricity of a particular blob is lower than a given threshold (meaning it is relatively round), the blob may be characterized as round. By contrast, if the eccentricity of the blob is greater than a given threshold, the blob may be characterized as flat, or as non-round. Morphological features of the blob may be further examined to characterize the size and shape of the blob (i.e., the corresponding kernel) in more nuanced ways.

Figure 7:
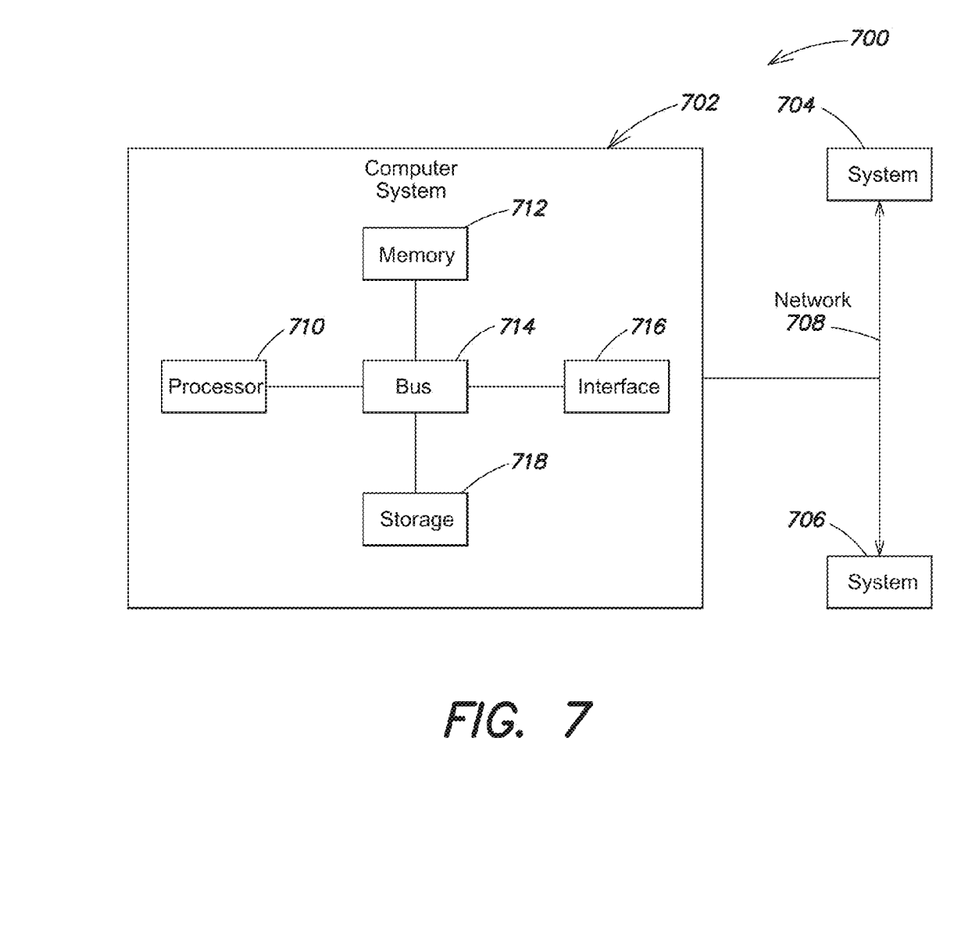
FIG. 7 is a block diagram of one example of a computer system on which aspects and embodiments of the present invention may be implemented.

FIG. 7 is a block diagram of a distributed computer system 700, in which various aspects and functions discussed above may be practiced. The distributed computer system 700 may include one or more computer systems. For example, as illustrated, the distributed computer system 700 includes three computer systems 702, 704 and 706. As shown, the computer systems 702, 704 and 706 are interconnected by, and may exchange data through, a communication network 708. The network 708 may include any communication network through which computer systems may exchange data. To exchange data via the network 708, the computer systems 702, 704, and 706 and the network 708 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, CORBA HOP, RMI, DCOM and Web Services.

According to some embodiments, the functions and operations discussed for producing a three-dimensional synthetic viewpoint can be executed on computer systems 702, 704 and 706 individually and/or in combination. For example, the computer systems 702, 704, and 706 support, for example, participation in a collaborative network. In one alternative, a single computer system (e.g., 702) can generate the three-dimensional synthetic viewpoint. The computer systems 702, 704 and 706 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer system 702 shown in FIG. 7. In one embodiment, computer system 702 is a personal computing device specially configured to execute the processes and/or operations discussed above. As depicted, the computer system 702 includes at least one processor 710 (e.g., a single core or a multi-core processor), a memory 712, a bus 714, input/output interfaces (e.g., 716) and storage 718. The processor 710, which may include one or more microprocessors or other types of controllers, can perform a series of instructions that manipulate data. As shown, the processor 710 is connected to other system components, including a memory 712, by an interconnection element (e.g., the bus 714).

The memory 712 and/or storage 718 may be used for storing programs and data during operation of the computer system 702. For example, the memory 712 may be a relatively high performance, volatile, random access memory such as a dynamic random access memory (DRAM) or static memory (SRAM). In addition, the memory 712 may include any device for storing data, such as a disk drive or other non-volatile storage device, such as flash memory, solid state, or phase-change memory (PCM). In further embodiments, the functions and operations discussed with respect to generating and/or rendering synthetic three-dimensional views can be embodied in an application that is executed on the computer system 702 from the memory 712 and/or the storage 718. For example, the application can be made available through an "app store" for download and/or purchase. Once installed or made available for execution, computer system 702 can be specially configured to execute the functions associated with producing synthetic three-dimensional views.

Computer system 702 also includes one or more interfaces 716 such as input devices (e.g., camera for capturing images), output devices and combination input/output devices. The interfaces 716 may receive input, provide output, or both. The storage 718 may include a computer-readable and computer-writeable nonvolatile storage medium in which instructions are stored that define a program to be executed by the processor. The storage system 718 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 702 may include an operating system that manages at least a portion of the hardware components (e.g., input/output devices, touch screens, cameras, etc.) included in computer system 702. One or more processors or controllers, such as processor 710, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Sun Microsystems, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for generating and manipulating images may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 702 is shown by way of example as one type of computer system upon which various functions for producing three-dimensional synthetic views may be practiced, aspects and embodiments are not limited to being implemented on the computer system, shown in FIG. 7. Various aspects and functions may be practiced on one or more computers or similar devices having different architectures or components than that shown in FIG. 7.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method for processing a digital image, the method comprising:
for each of a plurality of candidate threshold values, processing an image using the candidate threshold value to create a first segmented binary image of a first plurality of blobs;
for each of the plurality of candidate threshold values, calculating a threshold value evaluation metric as a count of qualifying blobs in the first plurality of blobs in the first segmented binary image, wherein the qualifying blobs have a fill factor exceeding a predefined fill factor and have an area within a predefined area range;
identifying an optimal threshold value from the plurality of candidate threshold values for which the threshold value evaluation metric is maximized;
processing the image using the optimal threshold value to create a second segmented image of a second plurality of blobs;
determining a visible blob count of a number of visible blobs in the second segmented image of the second plurality of blobs;
determining an average of vertical separation between the visible blobs in the second segmented image of the second plurality of blobs;
determining an average of horizontal separation between the visible blobs in the second segmented image of the second plurality of blobs; and
estimating a total count based on the visible blob count, the average of the vertical separation between the visible blobs, and the average of the horizontal separation between the visible blobs.

2. The method of claim 1, wherein estimating the total count based on the visible blob count, the average of the vertical separation between the visible blobs, and the average of the horizontal separation between the visible blobs comprises providing the visible blob count, the average of the vertical separation between the visible blobs, and the average of the horizontal separation between the visible blobs as inputs to a plurality of regression decision trees, wherein the total count is a target variable of the plurality of regression decision trees.

3. The method of claim 1, further comprising dividing the image into a plurality of region images, wherein the plurality of region images corresponds to adjacent regions of the image.

4. The method of claim 3, further comprising transmitting the plurality of region images to a plurality of processors, wherein each of the plurality of processors performs the act of, for each of the plurality of candidate threshold values, processing a region image using the candidate threshold value to create the first segmented binary image of the first plurality of blobs.

5. The method of claim 1, further comprising:
validating that the total count exceeds a first predefined threshold; and
for each of a plurality of horizontal rows of blobs, validating that a count of the number of blobs in each of the plurality of horizontal rows of blobs exceed a second predefined threshold.

6. The method of claim 1, further comprising validating the image based on a characteristic selected from the group consisting of resolution, size, sharpness, and contrast.

7. The method of claim 1, wherein the predefined fill factor is 70%.

8. The method of claim 1, further comprising performing adaptive histogram equalization on the image.

9. The method of claim 1, further comprising:
 formatting the image to a Lab color space;
 determining, for each pixel in a plurality of pixels in the formatted image, a texture value of a region encompassing the pixel;
 responsive to the texture value of the region encompassing the pixel being greater than a predefined value, writing a first value for the pixel to a second image;
 responsive to the texture value of the region encompassing the pixel being less than the predefined value, writing a second value for the pixel to the second image; and
 cropping the image to a first region corresponding to a second region in the second image, wherein the plurality of pixels contained within the second region has the first value.

10. The method of claim 9, wherein determining, for each pixel in the plurality of pixels in the formatted image, the texture value of the region encompassing the pixel comprises determining an entropy value of the region encompassing the pixel.

11. The method of claim 1, further comprising:
 categorizing, for each blob in the second plurality of blobs, an area of the blob; and
 categorizing, for each blob in the second plurality of blobs, an eccentricity of the blob.

12. The method of claim 11, further comprising calculating at least one aggregate area metric of the second plurality of blobs, wherein categorizing, for each blob in the second plurality of blobs, the area of the blob is performed relative to the at least one area metric.

13. The method of claim 12, wherein the at least one aggregate area metric comprises a median area of the second plurality of blobs.

14. The method of claim 11, wherein categorizing, for each blob in the second plurality of blobs, the eccentricity of the blob is performed relative to a predefined eccentricity value.

15. An image processing system comprising:
 a memory;
 an image receiving component; and
 a processor configured to:
  for each of a plurality of candidate threshold values, process an image using the candidate threshold value to create a first segmented binary image of a first plurality of blobs;
  for each of the plurality of candidate threshold values, calculate a threshold value evaluation metric as a count of qualifying blobs in the first plurality of blobs in the first segmented binary image, wherein the qualifying blobs have a fill factor exceeding a predefined fill factor and have an area within a predefined area range;
  identify an optimal threshold value from the plurality of candidate threshold values for which the threshold value evaluation metric is maximized;
  process the image using the optimal threshold value to create a second segmented image of a second plurality of blobs;
  determine a visible blob count of a number of visible blobs in the second segmented image of the second plurality of blobs;
  determine an average of vertical separation between the visible blobs in the second segmented image of the second plurality of blobs;
  determine an average of horizontal separation between the visible blobs in the second segmented image of the second plurality of blobs; and
  estimate a total count based on the visible blob count, the average of the vertical separation between the visible blobs, and the average of the horizontal separation between the visible blobs.

16. The image processing system of claim 15, wherein estimating the total count based on the visible blob count, the average of the vertical separation between the visible blobs, and the average of the horizontal separation between the visible blobs comprises providing the visible blob count, the average of the vertical separation between the visible blobs, and the average of the horizontal separation between the visible blobs as input to a plurality of regression decision trees, wherein the total count is a target variable of the plurality of regression decision trees.

17. The image processing system of claim 16, wherein the processor is further configured to:
 validate that the total count exceeds a first predefined threshold; and
 for each of a plurality of horizontal rows of blobs, validate that a count of the number of blobs in each of the plurality of horizontal rows of blobs exceed a second predefined threshold.

18. The image processing system of claim 15, wherein the processor is further configured to divide the image into a plurality of region images, wherein the plurality of region images corresponds to adjacent regions of the image.

* * * * *

UNITED STATES PATENT AND TRADEMARK OFFICE
CERTIFICATE OF CORRECTION

PATENT NO. : 10,115,187 B2
APPLICATION NO. : 15/011004
DATED : October 30, 2018
INVENTOR(S) : Darrell L. Young et al.

Page 1 of 1

It is certified that error appears in the above-identified patent and that said Letters Patent is hereby corrected as shown below:

In the Specification

Column 9, Line 25 should read:
captured image (roughly $\pi$ radians), the amount of distortion Column 14, Line 32 should read:
XML, REST, SOAP, CORBA IIOP, RMI, DCOM and Web Signed and Sealed this
Twenty-fifth Day of December, 2018

Andrei Iancu
*Director of the United States Patent and Trademark Office*